US012424112B2

(12) United States Patent
Howell et al.

(10) Patent No.: US 12,424,112 B2
(45) Date of Patent: Sep. 23, 2025

(54) AIRCRAFT LANDING EVENT SYSTEM AND METHOD

(71) Applicants: AIRBUS OPERATIONS LIMITED, Bristol (GB); Airbus SAS, Blagnac (FR)

(72) Inventors: George Howell, Bristol (GB); Andrew Hebborn, Bristol (GB); James Bullen, Bristol (GB); Andrea Laruelo-Fernandez, Blagnac (GB)

(73) Assignees: AIRBUS OPERATIONS LIMITED, Bristol (GB); AIRBUS (S.A.S.), Blagnac (FR)

( * ) Notice: Subject to any disclaimer, the term of this patent is extended or adjusted under 35 U.S.C. 154(b) by 406 days.

(21) Appl. No.: 17/732,019

(22) Filed: Apr. 28, 2022

(65) Prior Publication Data

US 2022/0358849 A1 Nov. 10, 2022

(30) Foreign Application Priority Data

Apr. 29, 2021 (GB) ...................................... 2106172

(51) Int. Cl.
*G08G 5/51* (2025.01)
*B64D 45/04* (2006.01)
*G08G 5/25* (2025.01)
*G08G 5/26* (2025.01)
*G08G 5/54* (2025.01)

(52) U.S. Cl.
CPC ............... *G08G 5/51* (2025.01); *B64D 45/04* (2013.01); *G08G 5/25* (2025.01); *G08G 5/26* (2025.01); *G08G 5/54* (2025.01)

(58) Field of Classification Search
CPC .... G08G 5/065; G08G 5/0008; G08G 5/0013; G08G 5/025; G08G 5/0021; B64D 45/04; B60T 8/1703; B60T 8/172; B64C 25/46
See application file for complete search history.

(56) References Cited

U.S. PATENT DOCUMENTS 9,701,401 B2 7/2017 Raby et al.
10,319,237 B1 6/2019 Schwartz et al.
(Continued)

FOREIGN PATENT DOCUMENTS

CN 106228500 12/2016
EP 1 884 462 2/2008
(Continued)

OTHER PUBLICATIONS

Extended European Search Report for Application No. 22170809.2, nine pages, dated Sep. 12, 2022.

*Primary Examiner* — Yuen Wong
(74) *Attorney, Agent, or Firm* — Nixon & Vanderhye P.C.

(57) ABSTRACT

An aircraft landing event system is disclosed including a processor, the processor being configured to receive aircraft braking performance information from a plurality of aircraft that have performed a landing event on a particular runway. The processor is configured to determine an aircraft braking performance indicator on the basis of the aircraft braking performance information of the plurality of aircraft, and communicate the aircraft braking performance indicator to an aircraft landing system of an approaching aircraft that is about to perform a landing event on the particular runway.

17 Claims, 3 Drawing Sheets

(56) References Cited

U.S. PATENT DOCUMENTS

| | | | |
|---|---|---|---|
| 2009/0292483 A1 | | 11/2009 | Journade et al. |
| 2014/0107872 A1 | | 4/2014 | Rado |
| 2015/0142388 A1 | * | 5/2015 | Metzger .................. B60T 8/172 |
| | | | 702/189 |
| 2015/0316929 A1 | * | 11/2015 | Veronesi ............... B64C 25/426 |
| | | | 701/16 |
| 2016/0140854 A1 | | 5/2016 | Enns et al. |
| 2019/0251852 A1 | | 8/2019 | Moll |
| 2020/0013297 A1 | | 1/2020 | Kanagarajan et al. |
| 2020/0180781 A1 | | 6/2020 | Mckeown et al. |

FOREIGN PATENT DOCUMENTS

| | | | | |
|---|---|---|---|---|
| EP | 2 940 675 | | 11/2015 | |
| EP | 3 471 081 | | 4/2019 | |
| GB | 2599167 A | * | 3/2022 | ............ B60T 8/1703 |
| WO | 2016/201275 | | 12/2016 | |

\* cited by examiner

AIRCRAFT LANDING EVENT SYSTEM AND METHOD

CROSS RELATED APPLICATION

This application claims priority to United Kingdom Patent Application GB 2106172.6, filed Apr. 29, 2021, the entire contents of which is hereby incorporated by reference.

TECHNICAL FIELD

The present invention relates to aircraft systems, specifically aircraft landing event systems, to aircraft comprising such aircraft systems, and to methods of determining aircraft braking performance indicators.

BACKGROUND

Landing distance calculations are typically performed by flight crew of an aircraft prior to a landing event on a runway. The landing distance calculation may take into account factors such as aircraft weight, a predicted landing speed, whether the aircraft uses reverse thrusters, and the state of the runway.

The runway state is communicated to the aircraft, such as from a ground station of the runway. The runway state is reported as 'wet' or 'dry', such as by ground crew of the runway, with each state being associated with a multiplication factor for use in calculating the landing distance. For example, a landing distance may be multiplied by a factor of 1.15 if the runway is considered 'wet'.

Embodiments of the invention described herein provide a more accurate determination of the runway state for landing distance calculations.

SUMMARY

A first aspect of the present invention provides an aircraft landing event system comprising a processor configured to: receive aircraft braking performance information from a plurality of aircraft that have performed a landing event on a particular runway; determine an aircraft braking performance indicator on the basis of the aircraft braking performance information of the plurality of aircraft; and communicate the aircraft braking performance indicator to an aircraft landing system of an approaching aircraft that is about to perform a landing event on the particular runway.

In other words, the aircraft braking performance information from plural previously landed aircraft is combined, or consolidated, to determine the aircraft braking performance indicator. The aircraft braking performance information from each aircraft may be representative of a condition of the runway at the time of the respective landing event. As such, a more accurate indication of the condition of the runway can be built up by using aircraft braking performance information from multiple aircraft that have performed landing events on the runway.

Optionally, the aircraft landing event system comprises a receiver configured to receive the aircraft braking performance information from the plurality of aircraft. Optionally, the aircraft landing event system comprises a memory communicatively coupled to the processor, the memory configured to store the aircraft braking performance information, and/or the aircraft braking performance indicator. Optionally, the processor is configured to cause the aircraft braking performance information, and/or the aircraft braking performance indicator, to be stored in the memory. Optionally, the aircraft landing event system comprises a transmitter configured to transmit the aircraft braking performance indicator to the aircraft landing system of the approaching aircraft.

Optionally, the aircraft braking performance information received by the processor comprises, for each one of the plurality of aircraft, a wheel slip determined by a braking system of the respective aircraft during the respective landing event.

Optionally, the wheel slip is a maximum wheel slip determined by the braking system. Optionally, the braking system of the respective aircraft, such as an anti-lock braking system of the respective aircraft, is configured to control braking of one or more wheels of the respective aircraft so that the wheel slip of the or each wheel is a maximum achievable wheel slip without the wheels, or respective brakes, locking. The maximum achievable wheel slip is affected by the condition of the runway. As such, determining the wheel slip of the respective aircraft during the respective landing event provides an indication of the runway condition during that landing event.

Optionally, the braking performance information is, or comprises, for each one of the plurality of aircraft, something other than a maximum wheel slip. Optionally, the braking performance information is, or comprises: a braking force; a braking torque; a friction coefficient of the runway; a maximum reactive force between one or more wheels of the landed aircraft 40 and the runway 20; or any other suitable braking performance information that may be used to infer a condition of the runway 20. Optionally, for each one of the plurality of aircraft, the braking performance information is determined, such by the braking system of the respective aircraft, or by the landing event system, on the basis of the wheel slip determined by the braking system of the respective aircraft.

Optionally, the aircraft braking performance information received by the processor comprises, for each one of the plurality of aircraft, an aircraft braking performance profile defining the aircraft braking performance information as a function of a position of the respective aircraft on the runway during the respective landing event.

Optionally, the position of the aircraft is a longitudinal position of the aircraft in a longitudinal direction of the runway, which is aligned with a direction of travel of the aircraft on the runway. Defining the aircraft braking performance information, such as the wheel slip, as a function of the longitudinal position of the respective aircraft on the runway provides an indication of the runway condition at each longitudinal position. The plural aircraft may travel over different lateral portions of the runway to one another. In this way, variations in the condition of the runway in a lateral direction of the runway, perpendicular to the longitudinal direction of the runway, may be captured by using the aircraft braking performance information from the plural aircraft that have performed landing events on the runway.

Optionally, the aircraft braking performance information comprises, for each one of the plurality of aircraft, an aircraft braking performance map defining the aircraft braking performance information, such as the wheel slip, as a function of the position of the aircraft in both the longitudinal and the lateral direction of the runway.

Optionally, to determine the braking performance indicator, the processor is configured to determine an average of the aircraft braking performance information.

That is, the processor may be configured to perform a statistical analysis on the aircraft braking performance information to determine the braking performance indicator.

Combining the braking performance information from each of the aircraft in the plurality of aircraft, such as by averaging the braking performance information, leads to a more accurate indication of the runway condition. In other words, by averaging the aircraft braking performance information, any spurious or inaccurate information from one aircraft may be compensated for by the information from the one or more other aircraft.

Optionally, to determine the braking performance indicator, the processor is configured to determine a weighted average of the aircraft braking performance information.

That is, the processor may give more weight to the aircraft braking performance information that is most representative of the runway state, in order to build a more accurate picture of the runway state.

Optionally, the weighted average of the aircraft braking performance information is weighted towards aircraft braking performance information of more recent landing events.

The aircraft braking performance information of the most-recent landing events may provide the most up-to-date indication of the current runway state. That is, weighting the average of the aircraft braking performance information towards more-recent landing events may provide a braking performance indicator that is more accurate, such as more representative of the of the current runway state.

Optionally, the processor is configured to determine a deviation of the aircraft braking performance information of the most recent landing event from the aircraft performance information of an earlier landing event.

The deviation may be a deviation of, such as a difference or ratio between, the aircraft braking performance information of two or more landing events as a function of the runway position. Optionally, the aircraft braking performance information for each landing event, such as the maximum wheel slip, is averaged over a range of runway positions, to give a "runway slip average", and the deviation is a deviation between the runway slip average for one landing event and the runway slip average of one or more other landing events.

Optionally, the processor is configured to determine a threshold deviation. Optionally, in the event the deviation determined by the processor is less than the threshold deviation, the processor is configured to determine the aircraft braking performance indicator on the basis of the aircraft braking performance information received from the plurality of aircraft.

In other words, if the deviation is less than the threshold deviation, it may be that the runway state has not changed between the most-recent landing event and the pervious landing event(s). That is, the aircraft braking performance information received from the plurality of aircraft may be considered accurate and representative of the actual runway state. As such, if the deviation is less than the threshold deviation, the processor may determine the braking performance indicator on the basis of the aircraft braking performance information, as normal.

Optionally, in the event the deviation determined by the processor exceeds the threshold deviation, the processor is configured to discard the aircraft braking performance information received from the plurality of aircraft and determine the aircraft braking performance indicator to be a predetermined aircraft braking performance indicator.

In other words, if the deviation is greater than the threshold deviation, it may be that the runway state has changed between the most-recent landing event and the previous landing event(s), such as due to precipitation, or that the aircraft braking performance data of the most-recent landing event is erroneous. That is, the aircraft braking performance information from at least one of the plurality of aircraft may be inaccurate, or not entirely representative of the actual runway state. As such, if the deviation exceeds the threshold deviation, the processor may discard the aircraft braking performance information received from the plurality of aircraft, and instead determine the aircraft braking performance indicator to be a predetermined aircraft braking performance indicator, such as a conservative multiplication factor.

Optionally, the threshold deviation is a predetermined threshold deviation. Optionally, the threshold deviation is a fixed value. Optionally, the deviation is defined as a function of the runway position. Optionally, the deviation threshold is determined using a statistical model. Optionally, the deviation threshold is a standard deviation from a normal distribution of the braking performance information of the plural aircraft. Optionally, the deviation threshold is 3 or 4 standard deviations of a normal distribution of the braking performance information of previous landing events.

Optionally, the processor is configured to determine, for the aircraft braking performance information received by the processor from each one of the plurality of aircraft, an elapsed time since the respective landing event occurred.

Optionally, the elapsed time for the aircraft braking performance information for each landing event is a time between the occurrence of the landing event and the "current time", which may be the time of determining the braking performance indicator by the processor.

Optionally, only the aircraft braking performance information for which the elapsed time is within a predetermined elapsed time threshold is used by the processor to determine the aircraft braking performance indicator.

In other words, the braking performance information for each landing event may be associated with a "validity time", during which the information can be considered to accurately represent the current runway state. If the elapsed time for the aircraft braking performance information of a given landing exceeds the predetermined elapsed time threshold, or the validity time, then that information may be discarded, and not used in the determination of the aircraft braking performance indicator.

Optionally, the processor is configured to determine, based on the aircraft braking performance indicator, a landing distance of the approaching aircraft on the runway.

In this way, the landing distance may be determined more accurately based on the current state of the runway represented by the aircraft braking performance indicator. Specifically, by determining the actual runway state using the aircraft braking performance information from the plurality of aircraft, the determined landing distance may be less than that determined using a conservative multiplication factor.

Optionally, instead of, or in addition to, communicating the braking performance indicator to the approaching aircraft, the processor is configured to communicate the landing distance determined by the processor to the approaching aircraft.

Optionally, the aircraft braking performance indicator, or information representative thereof, or the landing distance, or information representative thereof, is communicated to a flight deck display of the approaching aircraft. In this way, the flight crew of the aircraft may receive an accurate and up-to-date assessment of the current runway state, and/or an accurate landing distance determined for the upcoming landing event of the aircraft on the runway. That is, the flight crew may be able to make a more informed decision on where on the runway to touchdown, or may be able to avoid making an unnecessary diversion in the event of an increase in a length of runway required for the landing event, such as in the event of a reduction in performance of a braking system or other retardation or landing system of the aircraft.

A second aspect of the present invention provides a method of determining an aircraft braking performance indicator, comprising: receiving aircraft braking performance information from a plurality of aircraft that have performed a landing event on a particular runway; determining an aircraft braking performance indicator on the basis of the aircraft braking performance information of the plurality of aircraft; and communicating the aircraft braking performance indicator to an aircraft landing system of an approaching aircraft that is about to perform a landing event on the particular runway.

Optionally, the method comprises performing any of the actions performed by the processor of the aircraft landing event system of the first aspect. As such, the optional features of the aircraft landing event system of the first aspect may equally apply to the method of the second aspect.

A third aspect of the present invention provides a non-transitory, computer-readable storage medium storing instructions that, when executed by a processor, is configured to perform the method of the second aspect.

A fourth aspect of the present invention provides an aircraft landing event system comprising: a receiver configured to receive aircraft braking performance information from a plurality of aircraft that have performed a landing event on a particular runway; a processor configured to determine an aircraft braking performance indicator based on the aircraft braking performance information received by the receiver; and a transmitter configured to transmit the aircraft braking performance indicator to an aircraft landing system of an approaching aircraft that is about to perform a landing event on the particular runway.

Optionally, the aircraft landing event system of the fourth aspect comprises any of the optional features of the aircraft landing event system of the first aspect.

A fifth aspect of the present invention provides an aircraft comprising the aircraft landing event system of the first aspect, the aircraft landing event system of fourth aspect, or the non-transitory computer-readable storage medium of the third aspect.

Optionally, the aircraft comprises the aircraft landing system to which the aircraft braking performance indicator is communicated. Optionally, the aircraft landing event system comprises the aircraft landing system. Optionally, the aircraft comprises a flight deck. Optionally, the landing event system comprises a flight deck display in the flight deck. Optionally, the communicating the aircraft braking performance indicator to the aircraft landing system comprises communicating the aircraft braking performance indicator to the flight deck display.

BRIEF DESCRIPTION OF THE DRAWINGS

Embodiments of the invention will now be described, by way of example only, with reference to the accompanying drawings, in which.

DETAILED DESCRIPTION

A landing event system according to an example of the present invention uses braking performance information from aircraft that have landed on a runway to more accurately determine the runway state, such as for landing distance calculations of an approaching aircraft. Specifically, a previously landed aircraft records its braking performance during a landing event on the runway, such as by recording a level of 'wheel slip' determined by a braking control system of the aircraft during the landing event, as will be described in more detail hereinafter. The braking performance of the aircraft is affected by, and is representative of, a condition of the surface of the runway.

This braking performance information is communicated by the previously landed aircraft to a ground station, or directly to another aircraft approaching the runway. The ground station (or landing aircraft) receives such braking performance information from plural aircraft that have recently landed on the runway. The braking performance information from the plural aircraft is then averaged by the landing event system. Specifically, in one example, the landing event system determines a weighted average of the braking performance information received from the plurality of previously landed aircraft. The weighted average is weighted towards the braking performance information of the most recent landing event.

In examples, the average braking performance information is used—either by the landing event system itself or by a landing system of the landing aircraft approaching the runway—in determining a landing distance of the landing aircraft on the runway. As noted above, the braking performance information provides a more accurate estimate of the actual state of the runway for landing. This provides an improvement over determining a landing distance on the basis of, say, a conservative multiplication factor, such as in the event a runway state is reported by ground crew simply as "wet" or "dry". This is at least because there could be various levels of "wetness", and because not all runways offer the same amount of friction, even when dry. In this way, the present invention provides the flight crew of the landing aircraft an accurate and up-to-date assessment of the runway state so that a decision on where on the runway to touchdown, or even whether to divert, is made more accurately.

We now describe in more detail an example, which we herein refer to as an "illustrated example", of the invention with reference to the Figures.

Figure 1:
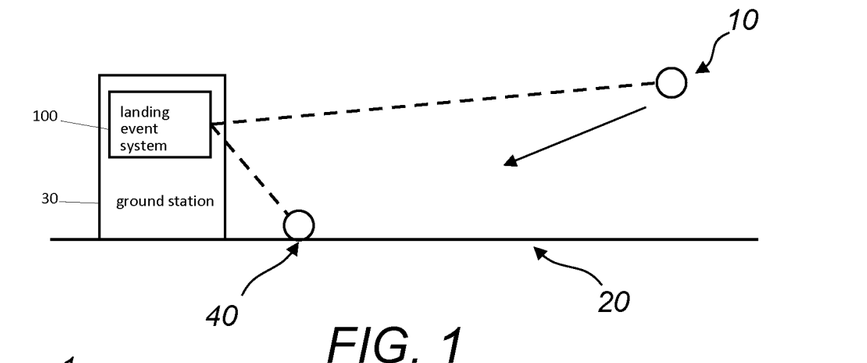
FIG. 1 shows a schematic view of an example runway.

FIG. 1 shows a schematic diagram of a runway 20 comprising a ground station 30, an approaching aircraft 10 approaching the runway 20 to perform a landing event on the runway 20, and a previously landed aircraft 40 that has previously performed a landing event on the runway 20. The ground station 30 comprises a landing event system 100. The previously landed aircraft 40 and the approaching aircraft 10 are communicatively coupled, or couplable, to the landing event system 100. In some examples, the previously landed aircraft 40 is communicatively coupled, or couplable, to the approaching aircraft 10. The approaching aircraft 10 may herein be referred to as a "landing aircraft 10", while the previously landed aircraft 40 may herein be referred to as a "landed aircraft 40".

Figure 2:
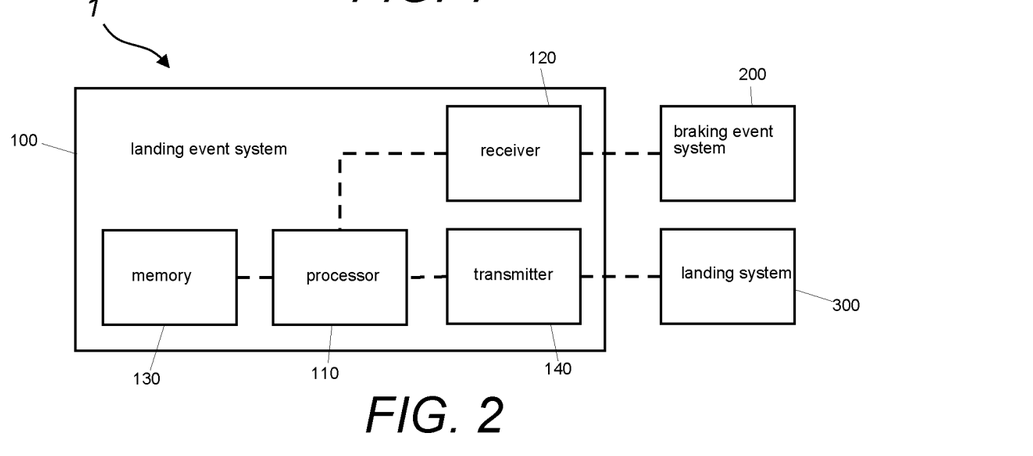
FIG. 2 shows a schematic view of an example system comprising an example landing event system.

FIG. 2 shows a schematic diagram of a system 1 comprising the landing event system 100 of the illustrated example, which will be described in more detail hereinafter. The system 1 also comprises a braking event system 200 of the landed aircraft 40 and a landing system 300 of the landing aircraft 10.

The braking event system 200 is configured to record and communicate braking performance information of a recent landing event of the landed aircraft 40 on the runway 20 to the landing event system 100. More specifically, in the illustrated example, the braking event system 200 is configured to determine a maximum wheel slip experienced by the landed aircraft 40 during the landing event of the aircraft 40 on the runway 20. In other words, the braking performance information determined by the braking event system 200 is representative of a maximum wheel slip of one or more wheels of the landed aircraft 40 during the landing event. The wheel slip determined by the braking event system 200 is described in more detail hereinafter with reference to FIGS. 4a-c.

The landing event system 100 of FIG. 2 comprises a processor 110, a memory 130, a receiver 120, and a transmitter 140. The processor 110 is communicatively coupled to the memory 130, the receiver 120 and the transmitter 140. The memory 130 is a local computer-readable storage medium. In other examples, the memory 130 may be a remote memory, such as a cloud-based memory. In some examples, the receiver 120 and transmitter 140 are a part of a single communications module, to which the processor 110 is communicatively coupled.

The receiver 120 is communicatively coupled, or couplable, to the braking event system 200 of the landed aircraft 40, and is configured to receive signals representative of the braking performance information determined by the braking event system 200. The receiver 120 is further communicatively coupled, or couplable, to braking event systems 200 of other previously landed aircraft that have landed on the runway 20, to receive respective braking performance information from those aircraft. In other words, the system 1 is configured to use the plural previously landed aircraft 40 as sensors for recording a runway 20 state. The communicative coupling in this example is a wireless coupling using any suitable communications protocol.

Figure 4A:
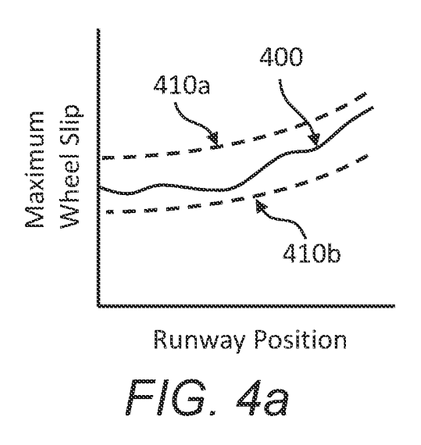
FIGS. 4(a) to 4(c) show example wheel slip profiles.
Figure 4B:
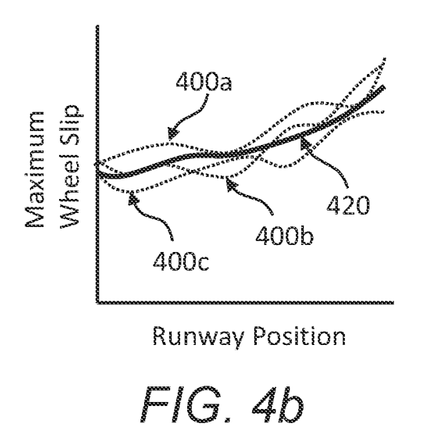
Figure 4C:
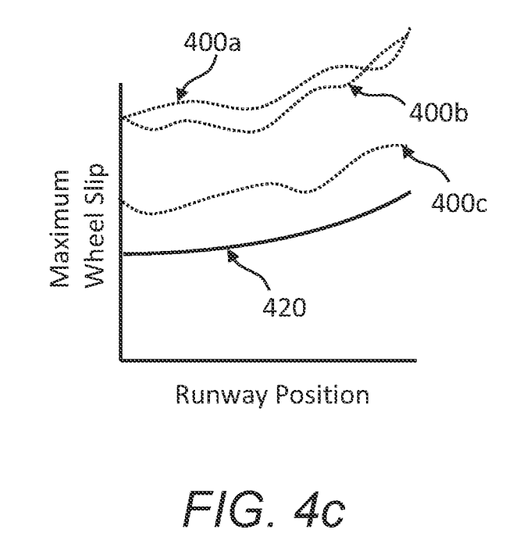

The processor 110 is configured to cause braking performance information received by the receiver 120 to be stored in the memory 130. The processor 110 is configured to determine, on the basis of braking performance information of plural previously-landed aircraft 40 stored in the memory 130, a braking performance indicator which, as will be described in more detail hereinafter with reference to FIGS. 4a-c, is an average of the braking performance information. The processor 110 is configured to cause the transmitter 140 to transmit, or communicate, the braking performance indicator, or information representative thereof, to the landing system 300 of the landing aircraft 10. That is, the transmitter 140 is communicatively coupled, or couplable, to the landing system 300 of the landing aircraft 10. The communicatively coupling is a wireless coupling using any suitable networked communications protocol.

Figure 3:
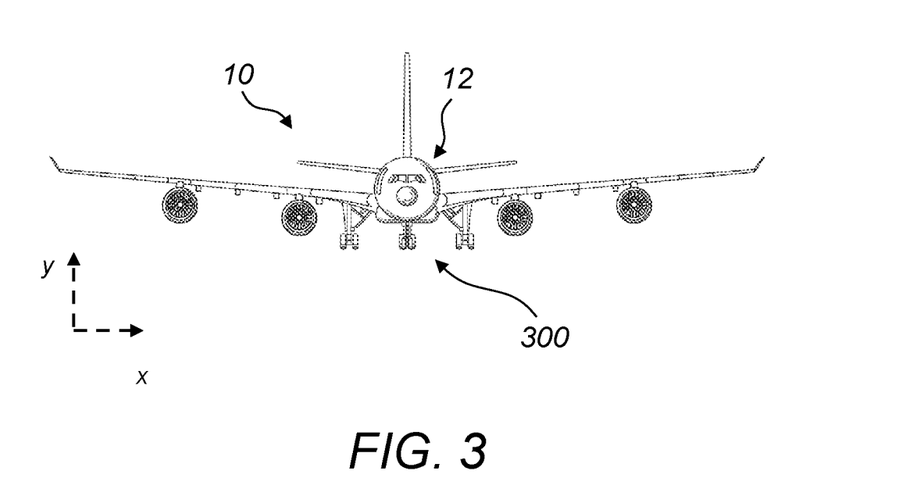
FIG. 3 shows a schematic view of an example aircraft.

FIG. 3 shows an example of the landing aircraft 10. The landing aircraft 10 comprises the landing system 300 and a flight deck 12. In some examples, the landing system 300 comprises a display (not shown) comprised in the flight deck 12. In some examples, the landing system 300 causes the braking performance indicator, or the information representative thereof, to be displayed on the display, such as to flight crew in the flight deck 12. A flight crew in the flight deck 12 may then determine a landing distance on the basis of the braking performance indicator and/or the information representative thereof.

Turning now to FIGS. 4a-c, we describe in more detail an example of the braking performance information determined by the braking event system 200 of the landed aircraft 40 and analysed by the landing event system 100. In the illustrated example, the braking performance information is a maximum wheel slip of one or more wheels (not shown) of the landed aircraft 40. The wheel slip, which is controlled by a braking system of the landed aircraft 40, such as by the braking event system 200, can be defined and determined in various ways but is typically expressed as a ratio between an aircraft speed and a wheel speed. In the illustrated example, the wheel slip of a wheel of the aircraft 40 is determined as $$\lambda = \frac{v - \omega r}{v},$$

where v is the aircraft (ground) speed, $\omega$ is the angular velocity of the wheel, and r is a radius of the wheel. The term $\omega r$ is a tangential velocity ($v_T$) of the wheel at a point where the wheel meets the ground. The wheel slip $\lambda$ therefore represents a relative speed of an outer surface of the wheel and the ground. In other examples, the wheel slip may be defined in any other suitable way.

When the aircraft 40 is travelling along the runway 20, and the wheel is rolling such that the tangential velocity $v_T$ is equal to, or close to, the aircraft velocity v, the wheel slip $\lambda$ will be zero, or close to zero. As the wheel is braked, the angular velocity $\omega$ is reduced and the wheel slip increases. If the wheel is braked strongly enough, it will "lock" and slide along the runway surface. This leads to an angular velocity $\omega$ of zero, and a maximum wheel slip $\lambda$ of unity (i.e. $\lambda$=1) for a locked wheel. In other words, beyond a certain level of slip, the braking regime could become unstable and the wheel could lock. The point at which the braking becomes unstable is dependent on a condition of the runway 20. For example, on a dry runway 20, a level of friction attainable between the wheel and the ground is higher than on a wet runway 20, so a higher level of slip can be maintained on a dry runway 20 before the wheel locks.

In the present example, the landed aircraft 40 comprises an anti-lock braking system (ABS), which is configured to brake the wheels of the aircraft 40 at, or close to, a maximum level of slip before the wheels lock. That is, the braking is "antiskid limited", wherein a closed-loop control system is used to control the braking force to maintain as much slip as possible, during the braking event, without locking the wheel. As such, the ABS can be used to determine a maximum wheel slip during the landing event of the landed aircraft 40 on the runway 20. In the illustrated example, the maximum wheel slip is recorded by the landed aircraft 40 as a function of a location of the landed aircraft 40 on the runway 20 during the landing event. In some examples, this "runway position" is a distance the landed aircraft 40 has travelled since it touched down on the runway 20. In other examples, the runway position is an absolute position, such as a longitudinal position, of the landed aircraft 40 on the runway 20. In some examples, the maximum wheel slip profile is also provided as a function of a lateral position of the landed aircraft 40 on the runway. That is, the maximum wheel slip profile may be provided in the form of a "map" of the wheel slip profile over different longitudinal and latitudinal portions of the runway 20.

FIG. 4a shows an example of a (longitudinal) slip profile 400 of a wheel (or plural wheels) of the landed aircraft 40, along with an idealised "dry" slip profile 410a for a dry runway 20 and an idealised "wet" slip profile 410b for a wet runway 20. It will be understood that a more accurate landing distance can be calculated using the actual slip profile 400 than merely assuming the runway 20 is "wet" and using a multiplication factor associated with the idealised wet slip profile 410b, for example. That is, the actual slip profile 400 provides a more accurate indication of the runway state than the idealised wet or dry profiles, 410a and 410b.

The wheel slip profiles in FIG. 4a are shown to generally increase with distance travelled along the runway. This may be due to an increasing level of friction able to be developed between the landed aircraft 40 and the runway 20 during the landing event. In other examples, this need not be the case, and the wheel slip may have any other suitable profile, such as decreasing with distance travelled along the runway 20. In some examples, an "effective weight" of the landed aircraft 40, and/or a friction coefficient between the wheel(s) and the runway 20, may increase as the landed aircraft 40 slows. The effective weight specifically may be a difference between a stationary weight of the landed aircraft 40 and a lift provided by aerodynamic surfaces of the landed aircraft 40 as it travels on the runway. As the landed aircraft 40 slows, and/or as a configuration of the landed aircraft 40 changes, such as by changing a position of slats, flaps, or other aerodynamic surfaces of the landed aircraft 40, the lift may decrease. This may lead to an increase in effective weight and, as such, an increase in the level of wheel slip achievable with distance along the runway 20. It will be appreciated that different types and/or models of the landed aircraft 40 may exhibit different lift characteristics and wheel slip profiles during a landing event.

FIG. 4b shows an example of an average wheel slip profile 420, such as determined by the processor 110 of the landing event system 100. The average wheel slip profile 420 is an average of three maximum wheel slip profiles 400a-400c of landing events of three respective previously landed aircraft 40. Specifically, in the illustrated example, the processor 110 is configured to determine a weighted average of the three maximum wheel slip profiles 400a-400c, weighted towards that of the most recent landing event. In some examples, the weighted average is weighted towards the maximum wheel slip profiles 400a-400c of any other of the landing events, such as the maximum wheel slip profile 400b of the second-most recent landing event. There may be any number of maximum wheel slip profiles 400a-400c, such as more than three, or only two, maximum wheel slip profiles included in the average wheel slip profile 420 determined by the processor 100.

In the illustrated example, the processor 110 determines the average wheel slip profile 420 as a function of the position of the landed aircraft 40 on the runway 20. In some examples, the average wheel slip profile 420 is determined over a length of the runway 20 for which braking performance information is available for each of the prior landing events. In some such examples, the maximum wheel slip profiles are, or are adjusted to be, provided as functions of an actual position of the aircraft on the runway, rather than a distance the aircraft has travelled since landing on the runway 20, as noted hereinbefore. In some examples, where a maximum wheel slip profile is provided as maximum wheel slip map, as described hereinbefore, the average wheel slip profile may be an average wheel slip map, wherein the average wheel slip is provided as a function of the longitudinal and lateral position of the landed aircraft 40 on the runway 20 during the landing event.

FIG. 4C shows an example set of maximum wheel slip profiles 400a-400c. In this example, the maximum wheel slip profile 400c of the most-recent landing event deviates from the maximum wheel slip profiles 400a and 400b of earlier landing events. This may arise when, for example, a condition of the runway 20 changes, or due to different closed-loop control tolerances of, and/or spurious braking performance indicators recorded by, the respective landed aircraft 40. In this example, the processor 110 is configured to set the average wheel slip profile 420 as a default conservative maximum wheel slip profile 420, such as the idealised "wet" profile 410b shown in FIG. 4a.

Specifically, in some examples, the processor 110 is configured to determine a deviation of the braking performance indicator of the most recent landing event (which, in the example illustrated in FIG. 4c, is the maximum wheel slip profile labelled 400c) from a braking performance indicator of an earlier landing event (e.g. one or both of the maximum wheel slip profiles labelled 400a and 400b in FIG. 4c). In some examples, the processor 110 is configured to compare the deviation to a deviation threshold (not shown). If the processor 110 determines that the deviation, for a given landing event, is less than the deviation threshold, the processor 110 is configured to use the braking performance information 400c of that landing event to determine the average braking performance indicator 420 (i.e. the average wheel slip profile 420). If the deviation determined by the processor 110 exceeds the deviation threshold, the processor 110 is configured to determine the average aircraft braking performance indicator to be a predetermined braking performance indicator, such as the idealised wet slip profile 410b as discussed hereinbefore. In other words, in the event a received maximum wheel slip profile 400c is significantly different to one or more (or an average of) previously-received maximum wheel slip profiles 400a and 400b, each of the received maximum wheel slip profiles 400a and 400b is discarded and the average wheel slip profile 420 is replaced with a conservative maximum wheel slip profile 410b.

In some examples, the deviation is a deviation of, such as a difference or ratio between, the maximum wheel slip 400a-400c of two or more landing events as a function of the runway position. In other examples, the maximum wheel slip 400a-400c for each landing event is averaged over a range of runway positions, to give a "runway slip average", and the deviation is a deviation between the runway slip average for one landing event and the runway slip average of one or more other landing events.

In some examples, the deviation threshold is a predetermined deviation threshold. In some examples, the threshold is a fixed value, or is defined as a function of the runway position. In other examples, the deviation threshold is dependent on the received braking performance information 400a-400c. In some such examples, the deviation threshold is a statistical model, such as a standard deviation from a normal distribution of the braking performance information 400a-400c of previous landing events. Specifically, in some examples, the deviation threshold is 3 or 4 standard deviations of a normal distribution of the braking performance information 400a-400c of previous landing events.

In some examples, the processor 110 is configured to determine an elapsed time since each of the maximum wheel slip profiles 400a-400c was recorded by the system 1, and/or provided to the landing event system 100. The elapsed time is a time between the landing event during which the respective wheel slip profile 400a-400c was recorded and the time of determining the braking performance indicator, or the "current" time. The processor 110 is configured to compare the elapsed time to a threshold time, or "validity time". If the elapsed time for a given maximum wheel slip profile 400a-400c exceeds the validity time, then the processor 110 discards that maximum wheel slip profile 400a-400c and does not include that maximum wheel slip profile 400a-400c in determining the average wheel slip profile 420. The validity time may be up to 5 minutes, up to 10 minutes, up to 15 minutes, up to 30 minutes, up to an hour, up to two hours, or longer than two hours, for example.

As noted hereinbefore, a weighted average is calculated across a plurality of landing events. In the illustrated example, wheel slip profiles 400a-400c of more recent landing events are weighted more highly than those of earlier events. For instance, in use, the wheel slip profile 400c of the most recent event would attract the highest weighting, whereas the wheel slip profile 400a of the earliest event in the plurality of events under consideration would attract the lowest weighting. In other words, in some examples, the applied weighting is inversely proportional (or some other suitable inverse relation) to the elapsed time since the event occurred. In this way, the braking performance indicator determined by the processor 110, which in the illustrated example is a weighted average wheel slip profile 420, is more representative of the current state of the runway.

In some examples, the validity time is determined based on a condition of the runway 20, such as a condition represented by the maximum wheel slip profile 400a-400c, and/or an environmental or atmospheric condition of the runway 20, such as a meteorological condition during the respective landing event. For example, a maximum wheel slip profile 400a-400c that is indicative of a wet runway during a period of precipitation may have a longer validity time associated therewith than a maximum wheel slip profile 400a-400c that is indicative of a wet runway during a warm, dry period, where any surface water on the runway is likely to evaporate over time. In some examples, each maximum wheel slip profile 400a-400c, or braking performance indicator 400a-400c, is associated with its own validity time, which may be different to that of one or more other maximum wheel slip profiles 400a-400c.

In some examples, the maximum wheel slip is a maximum wheel slip of any one or more wheels of the landed aircraft 40. In some examples, the maximum wheel slip is an average maximum wheel slip of plural wheels of the landed aircraft.

In other examples, the braking performance information is, or comprises, something other than a maximum wheel slip, such as: a braking force or braking torque, which may be a minimum braking force or minimum braking torque, applied by brakes of the landed aircraft 40 to the wheels during the landing event; a determined friction coefficient of the runway; a maximum friction force between one or more wheels of the landed aircraft 40 and the runway 20; or any other suitable braking performance information that may be used to infer a condition of the runway 20. In some such examples, the maximum wheel slip is used to determine the braking performance information. That is, in some examples, the braking performance information shown in FIGS. 4a-4c is instead something other than maximum wheel slip, and may be determined, such as by the braking event system 200, the landing event system 100, and/or the aircraft landing system 300, on the basis of the maximum wheel slip provided by the braking event system 200. For example, the wheel slip profiles 400a-400c may instead be profiles of a friction coefficient of the runway, or a friction force able to be developed between one or more wheels of the landed aircraft 40 and the runway 20, or any other suitable braking performance indicator. Similarly, it will be appreciated that the idealised wet and dry wheel slip profiles 410a, 410b may instead be idealised wet and dry friction coefficient profiles 410a, 410b of the runway 20, or idealised profiles of a friction force, or reactive force, able to be developed between one or more wheels of the landed aircraft 40 and the runway 20 under wet and dry conditions, respectively.

In some examples, the braking performance information comprises other information related to the landing event, such as: a weight of the landed aircraft; a configuration of the landed aircraft 40, such as a configuration of slats, flaps and/or other aerodynamic surfaces of the landed aircraft 40; an airspeed of the landed aircraft; and/or a type, or model, of the landed aircraft 40.

In some examples, the braking performance information comprises, or is used to determine, an effective weight of the landed aircraft 40 during the respective landing event. For example, a lift of the landed aircraft 40 may be determined, by any suitable component of the system 1, on the basis of the aerodynamic configuration, the airspeed, and/or the type or model of the landed aircraft. The lift during the landing event may then be compared to the weight of the landed aircraft 40 to determine the "effective" weight of the landed aircraft 40, such as by determining a difference between the lift and the weight of the landed aircraft 40 over the course of the landing event. As noted hereinbefore, an increase in the effective weight of an aircraft may lead to an increase in the level of wheel slip achievable. In some examples, the braking performance information is determined on the basis of the wheel slip and the effective weight. A more accurate representation of the runway 20 condition, such as a level of friction of the runway 20, may be achieved by taking into account both the wheel slip and the effective weight of the landed aircraft 40 during the respective landing event.

In some examples, the braking performance information is converted by the system 1, such as by the braking event system 200, the landing event system 100, or the landing system 300, into a landing factor, such as a multiplication factor that can be applied to a landing distance calculation. In some such examples, landing factors of multiple landing events are averaged to provide an average landing factor, which can be applied to a landing distance calculation of an upcoming landing event of the landing aircraft 10.

Figure 5:
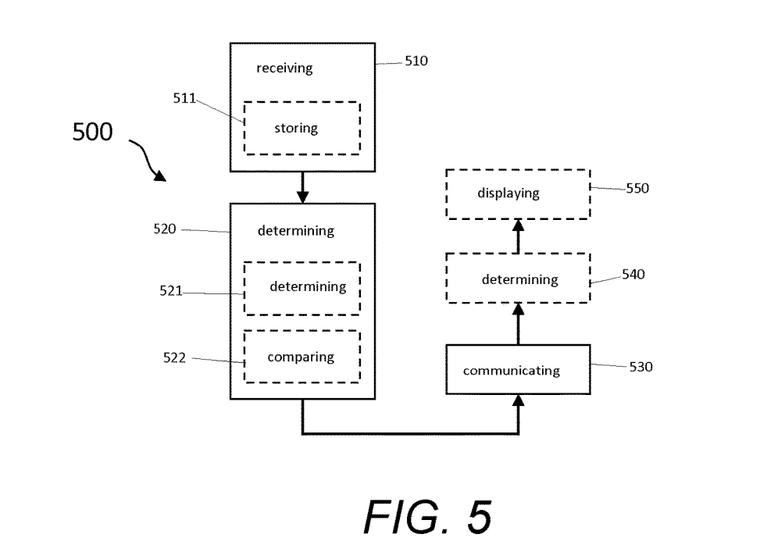
FIG. 5 shows a schematic method flow diagram according to an example.

Turning now to FIG. 5, shown and described is an example method 500 that is performed by the landing event system 100, such as by the processor 110 of the landing event system 100.

The method 500 comprises receiving 510, from the landed aircraft 40 and one or more other landed aircraft, braking performance information 400a-400c of an aircraft landing event of the respective aircraft on the runway 20. In other words, the method 500 comprises receiving 510 braking performance information 400a-400c from a plurality of aircraft 40 that have performed aircraft landing events on the runway 20. The braking performance indicators 400a-400c are received 510 from the respective landed aircraft 40 at different times, such as at the time of the respective landing event of the landed aircraft 40 on the runway 20. That is, the landing events are successive landing events on the runway 20.

In some examples, as shown with a dashed box in FIG. 5, the receiving 510 the braking performance information comprises storing 511 the braking performance information in the memory 130.

The method 500 comprises determining 520, on the basis of the received 510 braking performance information 400a-400c, a braking performance indicator 420. In some examples, the determining 520 the braking performance indicator 420 comprises determining 520 an average braking performance indicator 420, such as a weighted average braking performance indicator 420, as described hereinbefore.

In some examples, as shown with dashed boxes in FIG. 5, the determining 520 the braking performance indicator 420 comprises determining 521 a deviation of the braking performance information 400c of the most-recent landing event from aircraft braking performance information 400a-400b of an earlier landing event, as described hereinbefore. In some examples, the determining 520 the braking performance indicator further comprises comparing 522 the deviation to a deviation threshold as described hereinbefore. In some examples, in the event the deviation is less than the deviation threshold for a given braking event, the braking performance indicator is determined 520 on the basis of the braking performance information 400a-400c of that braking event. In some examples, in the event the deviation exceeds the deviation threshold, the average braking performance indicator is determined 520 to be a predetermined braking performance indicator as described hereinbefore. In some such examples, the braking performance information 400a-400c from each of the plurality of previously landed aircraft 40 is discarded if the deviation exceeds the deviation threshold.

The method 500 comprises communicating 530 the braking performance indicator 420, and/or information representative thereof, to the aircraft landing system 300 of the landing aircraft 10. In some examples, as shown with a dashed box in FIG. 5, the method 500 comprises determining 540 a landing distance on the basis of the braking performance indicator 420 and/or the information representative thereof, as described hereinbefore. In some such examples, the braking performance indicator 420, and/or the information representative thereof, communicated 530 to the aircraft landing system 300 is the determined 540 landing distance. In some examples, as also shown with a dashed box in FIG. 5, the method comprises displaying 550 the landing distance, and/or the braking performance indicator 420, and/or the information representative thereof, on the flight deck 12 display, as described hereinbefore.

In some examples, the method 500 includes any other action shown and described hereinbefore with reference to the system 1 of FIG. 2 and/or the braking performance indicators of FIGS. 4a-c.

Figure 6:
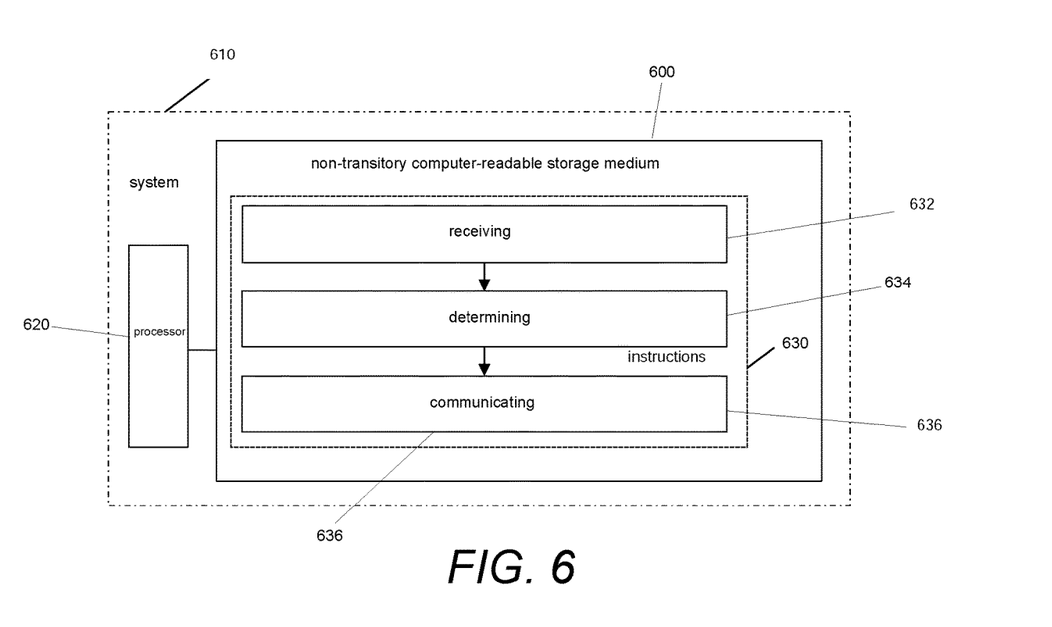
FIG. 6 shows a schematic view of an example non-transitory computer-readable storage medium.

FIG. 6 shows a schematic diagram of a non-transitory computer-readable storage medium 600 according to an example. The non-transitory computer-readable storage medium 600 stores instructions 630 that, if executed by a processor 620 of a system 610, cause the processor 620 to perform a method according to an example. In some examples, the system 610 is the landing event system 100 as described above with reference to FIG. 2 or any variation thereof discussed herein. The instructions 630 comprise: receiving 632 aircraft braking performance information 400a-400c from a plurality of aircraft 40 that have performed a landing event on a particular runway 20; determining 634 an aircraft braking performance indicator 420, on the basis of the aircraft braking performance information 400a-400c of the plurality of aircraft 40; and communicating 636 the aircraft braking performance indicator 420 to an aircraft landing system 300 of an approaching aircraft 10 that is about to perform a landing event on the particular runway 20. In other examples, the instructions 630 comprise instructions to perform any other example method described herein, such as the method 500 described above with reference to FIG. 5.

As noted hereinbefore, in some examples, a flight crew of the landing aircraft 10 determines a landing distance for an upcoming landing event of the aircraft 10 on the runway 20 on the basis of the braking performance indicator 420, or information representative thereof. It will be understood that, in other examples, the landing system 300 itself is configured to determine the landing distance as such. In some examples, the landing distance determined by the landing system 300 is displayed on the flight deck 12 display. In other examples, the landing event system 100 is configured to determine the landing distance and transmit the landing distance, or information representative thereof, to the landing system 300, such as instead of, or in addition to, communicating the braking performance indicator 420 to the landing system 300. In some examples, the landing distance, or information representative thereof, is made available to a control system of the landing aircraft 10, such as to be used in controlling the landing aircraft 10 during the landing event.

In some examples, the landing distance is calculated on the basis of a condition of the landing aircraft 10, as well as on the basis of a condition of the runway (as provided by the braking performance indicator 420, or information representative thereof). In examples, the condition of the landing aircraft 10 is any one or more of: a weight of the landing aircraft 10; an anticipated landing speed of the landing aircraft 10 on the runway 20 during the upcoming landing event; a type of the landing aircraft 10, such as whether the landing aircraft 10 has reverse thrusters; a condition of brakes of the landing aircraft 10, such as an operability and/or level of wear of the brakes; a configuration of the aircraft 10, such as a configuration of slats, flaps and/or other aerodynamic surfaces of the aircraft 10 during or prior to the upcoming landing event; and an anticipated retardation demand, or deceleration demand, such as a braking demand of the landing aircraft 10 during the upcoming landing event.

Although the landing event system 100 is shown and described hereinbefore as being a comprised in the ground station 30 of the runway 20, it will be understood that, in other examples, the landing event system 100 is instead comprised in the aircraft 10, and is configured to receive braking performance information from the ground station 30 and/or directly from the or each previously landed aircraft 40. In some such examples, the processor 110 and/or the transmitter 140 is directly connected, or connectable, to the landing system 300, such as by a wired connection. In other such examples, the landing event system 100 comprises the landing system 300.

It is to be noted that the term "or" as used herein is to be interpreted to mean "and/or", unless expressly stated otherwise.

The invention claimed is:

1. An aircraft landing event system, comprising:
a receiver configured to receive aircraft braking performance information from a plurality of aircraft that have performed a landing event on a particular runway;
a processor configured to determine an aircraft braking performance indicator on the basis of the aircraft braking performance information of the plurality of aircraft;

a transmitter configured to communicate the aircraft braking performance indicator to an aircraft landing system of an approaching aircraft that is about to perform a landing event on the particular runway;

wherein the processor is configured to cause control of at least a part of the landing system of the approaching aircraft based on the transmitted aircraft braking performance indicator; and, wherein the aircraft braking performance information received by the processor, for each one of the plurality of aircraft, comprises
a wheel slip,
a braking force,
a braking torque,
a friction coefficient of the runway, or
a maximum reactive force between one or more wheels of the landed aircraft and the runway, wherein the aircraft braking performance information is determined by a braking system of the respective aircraft during the respective landing event as a function of respective position of respective aircraft in both a longitudinal and a lateral direction of the runway, and wherein the processor is configured to control the braking system of the approaching aircraft based on the transmitted aircraft braking performance indicator and determine a landing distance of the approaching aircraft on the runway.

2. The aircraft landing event system of claim 1, wherein the aircraft braking performance information received by the processor comprises, for each one of the plurality of aircraft, a wheel slip determined by a braking system of the respective aircraft during the respective landing event.

3. The aircraft landing event system of claim 1, wherein the aircraft braking performance information received by the processor comprises, for each one of the plurality of aircraft, an aircraft braking performance profile defining the aircraft braking performance information as a function of a position of the respective aircraft on the runway during the respective landing event.

4. The aircraft landing event system of claim 1, wherein, to determine the braking performance indicator, the processor is configured to determine an average of the aircraft braking performance information.

5. The aircraft landing event system of claim 1, wherein, to determine the aircraft braking performance indicator, the processor is configured to determine a weighted average of the aircraft braking performance information.

6. The aircraft landing event system of claim 5, wherein the weighted average aircraft braking performance indicator is weighted towards aircraft braking performance information of more recent landing events.

7. The aircraft landing event system of claim 1, wherein the processor is configured to determine a deviation of the aircraft braking performance information of the most recent landing event from the aircraft performance information of an earlier landing event.

8. The aircraft landing event system of claim 7, wherein, in the event the deviation determined by the processor is less than a threshold deviation, the processor is configured to determine the aircraft braking performance indicator on the basis of the aircraft braking performance information received from the plurality of aircraft.

9. The aircraft landing event system of claim 8 wherein, in an event the deviation determined by the processor exceeds the threshold deviation, the processor is configured to discard the aircraft braking performance information received from the plurality of aircraft and determine the aircraft braking performance indicator to be a predetermined aircraft braking performance indicator.

10. The aircraft landing event system of claim 1, wherein the processor is configured to determine, for the aircraft braking performance information received by the processor from each one of the plurality of aircraft, an elapsed time since the respective landing event occurred.

11. The aircraft landing event system of claim 10, wherein only the aircraft braking performance information for which the elapsed time is within a predetermined elapsed time threshold is used by the processor to determine the aircraft braking performance indicator.

12. The aircraft landing event system of claim 1, wherein the processor is configured to determine, based on the aircraft braking performance indicator, a landing distance of the approaching aircraft on the runway.

13. The aircraft landing event system of claim 12, wherein instead of, or in addition to, communicating the aircraft braking performance indicator to the approaching aircraft, the processor is configured to communicate the landing distance determined by the processor to the approaching aircraft.

14. A method of determining an aircraft braking performance indicator, comprising:

receiving aircraft braking performance information from a plurality of aircraft that have performed a landing event on a particular runway;

providing a processor, wherein the processor is configured to determine an aircraft braking performance indicator on a basis of the aircraft braking performance information of the plurality of aircraft;

communicating the aircraft braking performance indicator to an aircraft landing system of an approaching aircraft that is about to perform a landing event on the particular runway;

wherein the processor is configured to cause control of at least a part of the landing system of the approaching aircraft based on the transmitted aircraft braking performance indicator;

wherein the aircraft braking performance information received by the processor, for each one of the plurality of aircraft, comprises
a wheel slip,
a braking force,
a braking torque,
a friction coefficient of the runway, or
a maximum reactive force between one or more wheels of the landed aircraft and the runway, wherein the aircraft braking performance information is determined by a braking system of the respective aircraft during the respective landing event as a function of respective position of respective aircraft in both a longitudinal and a lateral direction of the runway, and wherein the processor is configured to control the braking system of the approaching aircraft based on the transmitted aircraft braking performance indicator and determine a landing distance of the approaching aircraft on the runway.

15. A non-transitory, computer-readable storage medium storing instructions that, when executed by a processor, is configured to perform the method of claim 14.

16. An aircraft comprising the aircraft landing event system of claim 1.

17. An aircraft comprising the non-transitory computer-readable storage medium of claim 15.

\* \* \* \* \*